US009210181B1

(12) United States Patent
Nandy et al.

(10) Patent No.: US 9,210,181 B1
(45) Date of Patent: Dec. 8, 2015

(54) DETECTION OF ANOMALY IN NETWORK FLOW DATA

(71) Applicant: SOLANA NETWORKS INC., Ottawa (CA)

(72) Inventors: Biswajit Nandy, Ottawa (CA); Nabil Seddigh, Ottawa (CA); Rupinder Singh Makkar, Ottawa (CA); Hassan Halabian, Ottawa (CA); Ioannis Lambadaris, Ottawa (CA)

(73) Assignee: SOLANA NETWORKS INC., Ottawa, Ontario ( * ) Notice: Subject to any disclaimer, the term of this patent is extended or adjusted under 35 U.S.C. 154(b) by 0 days.

(21) Appl. No.: 14/287,182

(22) Filed: May 26, 2014

(51) Int. Cl.
*H04L 29/06* (2006.01)

(52) U.S. Cl.
CPC ........ *H04L 63/1416* (2013.01); *H04L 63/1408* (2013.01)

(58) Field of Classification Search
CPC .......................... G06F 21/552; H04L 63/1408
See application file for complete search history.

(56) References Cited

U.S. PATENT DOCUMENTS

| 8,001,583 | B2* | 8/2011 | Waizumi et al. ................... 726/3 |
| 8,418,249 | B1* | 4/2013 | Nucci et al. ....................... 726/23 |
| 8,682,812 | B1* | 3/2014 | Ranjan ............................. 706/12 |
| 8,832,832 | B1* | 9/2014 | Visbal .............................. 726/22 |
| 2005/0039086 | A1* | 2/2005 | Krishnamurthy ..... H04L 41/142 714/57 |
| 2005/0289219 | A1* | 12/2005 | Nazzal ................ H04L 63/1441 709/203 |
| 2006/0168168 | A1* | 7/2006 | Xia ......................... H04L 43/00 709/223 |
| 2007/0192863 | A1* | 8/2007 | Kapoor ................... G06F 9/505 726/23 |
| 2007/0226802 | A1* | 9/2007 | Gopalan ............... G06F 21/564 726/24 |
| 2009/0187795 | A1* | 7/2009 | Doverspike ............. H04L 43/02 714/43 |
| 2011/0185422 | A1* | 7/2011 | Khayam et al. .................. 726/23 |
| 2011/0276682 | A1* | 11/2011 | Ding et al. ...................... 709/224 |
| 2014/0222748 | A1* | 8/2014 | Mermoud ............. H04L 41/142 706/52 |
| 2015/0007173 | A1* | 1/2015 | Ionescu et al. ..................... 718/1 |

OTHER PUBLICATIONS

Daniela Brauckhoff et al., Applying PCA for Traffic Anomaly Detection: Problems and Solutions, IEEE INFOCOM 2009 proceedings, Apr. 19-25, 2009.
Anukool Lakhina et al., Characterization of Network-Wide Anomalies in Traffic Flows, IMC '04, Oct. 25-27, 2004, pp. 201-206, Taormina, Sicily, Italy.
Anukool Lakhina, Mining Anomalies Using Traffic Feature Distributions, SIGCOMM '05, Aug. 21-26, 2005, Philadelphia, Pennsylvania, USA.
Anukool Lakhina et al., Structural Analysis of Network Traffic Flows, SIGMETRICS/Performance '04, Jun. 12-16, 2004, pp. 61-72, New York, NY, USA.
Haakon Ringberg et al., Sensitivity of PCA for Traffic Anomaly Detection, SIGMETRICS '07, Jun. 12-16, 2007, San Diego, California, USA.

* cited by examiner

*Primary Examiner* — Morshed Mehedi
(74) *Attorney, Agent, or Firm* — IP-MEX Inc.; Victoria Donnelly

(57) ABSTRACT

Disclosed is a method 101 to be used on collected network data flow 116 associated with a network 100; the method 101 includes: an anomaly-detection operation 103 including: (A) obtaining the collected network data flow 116; and (B) performing an iterative principal component analysis on the collected network data flow 116 to detect an anomaly associated with the collected network data flow 116. The method may be used in a server and a network, and may also be implemented as a non-transitory computer-readable media. A corresponding system for detecting the anomaly in the network flow data is also provided.

22 Claims, 10 Drawing Sheets

| 118 | | | | 400 |
|---|---|---|---|---|
| 1.34 | 15.76 | 2.28 | 0.35 | |
| 1.15 | 10.79 | 2.30 | 1.49 | |
| 1.47 | 10.18 | 2.11 | 2.87 | |
| 1.01 | 20.48 | 2.27 | 1.02 | |
| 1.21 | 10.44 | 2.26 | 1.75 | |
| 3.19 | 10.64 | 2.06 | 1.67 | |

FIG. 4

| 118 | | | | 500 |
|---|---|---|---|---|
| -0.2216 | 2.7116 | 0.0666 | -1.1750 | |
| -0.4116 | -2.2583 | 0.0866 | -0.0350 | |
| -0.0916 | -2.8683 | -0.1033 | 1.3450 | |
| -0.5516 | 7.4316 | 0.0566 | -0.5050 | |
| -0.3516 | -2.6083 | 0.0466 | 0.2250 | |
| 1.6283 | -2.4083 | -0.1533 | 0.1450 | |

| 0.4681 |
| -0.4783 |
| -0.5693 |
| 0.4773 |

| 0.7807 | 0.2239 | 0.2665 | -0.2234 |
| 0.2239 | 0.7711 | -0.2723 | 0.2283 |
| 0.2665 | -0.2723 | 0.6758 | 0.2717 |
| -0.2234 | 0.2283 | 0.2717 | 0.7721 |

FIG. 10

| 118 | | | | | 1100 |
|---|---|---|---|---|---|
| 0.6975 | 1.0384 | 1.4662 | 1.1293 | 0.8530 | 2.0096 |

| 1.34 | 15.76 | 2.28 | 0.35 |
|---|---|---|---|
| 1.15 | 10.79 | 2.30 | 1.49 |
| 1.47 | 10.18 | 2.11 | 2.87 |
| 1.01 | 20.48 | 2.27 | 1.02 |
| 1.21 | 10.44 | 2.26 | 1.75 |
| 1.23 | 13.53 | 2.244 | 1.496 |

FIG. 12

DETECTION OF ANOMALY IN NETWORK FLOW DATA

FIELD OF THE INVENTION

The present invention generally relates to anomaly detection in networks, and in particular to the detection of anomaly in a network flow data.

Some aspects generally relate to (and are not limited to): (A) a method including detection of an anomaly associated with network flow data; (B) an apparatus configured for executing operations associated with detection of an anomaly associated with network flow data; (C) a network having the apparatus; and (D) non-transitory computer readable media having executable program configured to direct the apparatus to execute operations associated with detection of an anomaly associated with network flow data, amongst other things.

BACKGROUND OF THE INVENTION

Known network behavior anomaly detection is configured to: (A) provide an approach to detect network security threats; (B) provide a complementary technology to systems configured to detect security threats based on packet signatures (associated with data packets conveyed over a network); (C) provide continuous monitoring of a network for unusual events or trends; and (D) provide an integral part of network behavior analysis, which offers security in addition to that provided by known anti-threat applications (such as, firewalls, intrusion detection systems, antivirus software and spyware-detection software, etc.)

Known security monitoring systems (for networks) are configured to use a signature-based approach to detect threats associated with a network. They are configured to: (A) monitor packets (data packets) that are conveyed over the network; and (B) examine patterns in the data packets that match the contents of a database of signatures representing pre-identified known security threats. Network behavior anomaly detection based systems are configured to detect security threat vectors for cases where signature-based systems cannot; examples of such cases include: (A) new zero-day attacks (the first day of a new attack); and (B) when the threat traffic (data flow) is encrypted, such as the command and control channel for certain Botnets (a Botnet is a collection of Internet-connected programs communicating with other similar programs in order to perform tasks).

Known network behavior anomaly detection programs (computer programs) are configured to: (A) track critical network characteristics (in real time); and (B) generate an alarm for the case where a strange event or trend is detected in network characteristics (attributes) that may indicate a presence of a threat to a network. Examples of such characteristics include traffic volume, bandwidth use, protocol use, etc. In addition, known network behavior anomaly detection programs are also configured to monitor the behavior of individual network subscribers. In order for the network behavior anomaly detection program to be optimally effective, a baseline of normal network or user behavior may be established over a period of time. Once certain parameters have been defined as normal, any departure from one or more of the parameters (attributes) is flagged as anomalous.

Known network behavior anomaly detection programs may be used in addition to conventional firewalls and applications for the detection of malware. Some vendors have begun to recognize this fact by including network behavior anomaly detection programs as integral parts of their network security packages. For instance, network behavior anomaly detection technology and/or techniques (methods) are applied in a number of network and security monitoring domains, including: (A) log analysis; (B) packet inspection systems; (C) flow monitoring systems; and/or (D) route analytics.

For instance, network behavior anomaly detection may be used for detecting cyber-attacks directed to a network. Cyber-attack detection is primarily performed using signature based approaches. The attack is identified based on a known signature of that particular attack. Some of the techniques include: firewall log processing, simple network management protocol (SNMP) based tools, deep packet inspection (DPI), and security information and event management (SIEM) platforms. Another complementary approach for detecting attacks includes analyzing and identifying an anomaly in network traffic behavior. Some of the advantages of the anomaly detection based approach are: ability to detect attacks associated with encrypted traffic, ability to detect attacks at zero day, etc.

The following is a listing of published references that disclose cyber-attack detection methods and/or cyber-attack detection systems:

Published reference number [1]: LAKHINA, A., CROVELLA, M., DIOT, C., CHARACTERIZATION OF NETWORK-WIDE ANOMALIES IN TRAFFIC FLOWS, Proceedings of the 4th ACM SIGCOMM conference on Internet measurement, 2004, Page(s): 201-206.

Published reference number [2]: LAKHINA, A., PAPAGIANNAKI, K., CROVELLA M., DIOT, C., E. D., TAFT, N., STRUCTURAL ANALYSIS OF NETWORK TRAFFIC FLOWS, Proceedings of the joint international conference on Measurement and modeling of computer system, 2004, Page(s): 61-72.

Published reference number [3]: LAKHINA, A., CROVELLA, M., DIOT, C., MINING, ANOMALIES USING TRAFFIC FEATURE DISTRIBUTIONS, Proceedings of the ACM SIGCOMM Conference on Applications, Technologies, Architectures, and Protocols for Computer Communications, 2005, Page(s): 217-228.

Published reference number [4]: RINGBERG, H., REXFORD. J., SOULE, A., DIOT, C., SENSITIVITY OF PCA FOR TRAFFIC ANOMALY DETECTION, Proceedings of SIGMETRICS 2007, 2007.

Published reference number [5]: BRAUCKHOFF, D., SALAMATIAN, K., MAY, M., APPLYING PCA FOR TRAFFIC ANOMALY DETECTION: PROBLEMS AND SOLUTIONS, Proc. IEEE Infocom, Rio de Janeiro, April 2009.

Anomaly Detection Using Principal Component Analysis

An anomaly in network traffic (network data flow) is defined as any network activity or phenomenon that makes the network traffic pattern to not conform to the normal behavior (expected behavior) of a network. This definition may include network traffic outages, flash crowds, misconfigurations, vendor implementation bugs, cyber-attacks, network worms, malware, etc. A network anomaly may not always represent a security threat for the network.

An anomaly detection algorithm is an algorithm that is configured to detect and diagnose network anomalies of the network, so that a network administrator (user) may attempt to fix the problem (as quickly as they may, given the urgency of a potential threat to the network).

The principal component analysis (PCA) operation is a known method (operation) for detecting a network anomaly; reference is made to published reference [1], published reference [2], published reference [3], published reference [4], and published reference [5].

The PCA operation works based on the dimensional reduction property of the PCA method, and was shown to be effective in finding and diagnosing network anomalies in large networks where the dimension of the network is relatively large; reference is made to published reference [1], published reference [2], and published reference [3].

In anomaly detection, the number of columns of an input matrix may be equal to the number of features and the number of rows may be equal to the number of time-bins.

The various steps (operations) for the PCA operation are as follows (these operations are not depicted since they are known to persons of skill in the art):

Operation [1] includes directing a server (not depicted) to generate (create) a zero-mean traffic matrix (with mean zero for all the columns) from the [m×n] input network traffic matrix. Operational control is passed over to operation [2].

Operation [2] includes directing the server to generate (create) a covariance matrix of the zero-mean traffic matrix that was generated in operation [1]. Operational control is passed over to operation [3].

Operation [3] includes directing the server to calculate the eigenvalues and eigenvectors of the covariance matrix that was generated in operation [2]. Operational control is passed over to operation [4].

Operation [4] includes directing the server to sort the eigenvalues and select the first [k] largest eigenvalues and consider the corresponding eigenvectors to be principal components. Operational control is passed over to operation [5].

Operation [5] includes directing the server to create a matrix [P] by putting the principal vectors together. Operational control is passed over to operation [6].

Operation [6] includes directing the server to map the input matrix into the anomalous space by using the following formula, as follows:

$$\tilde{x}=(I-PP^T)x$$

resulting in an anomalous space mapping matrix. Once the above formula has been executed, operational control is passed over to operation [7].

Operation [7] includes directing the server to calculate the anomaly score for each time-bin by finding (computing or calculating) the square prediction error (SPE) score by using the following formula:

$$\|\tilde{x}\|^2$$

Once the SPE score has been executed, operational control is passed over to operation [8].

Operation [8] includes directing the server to: (A) compare the SPE score with a threshold; (B) detect an anomaly for the case where the SPE score is larger than the threshold; and (C) mark the SPE score as normal for the case where the SPE score is less than (or equal to) the threshold. Then, operational control may be passed over to operation [1], if so desired.

There are two main issues with the application of the PCA operation for anomaly detection as described below.

The first issue is a sensitivity problem. The PCA operation may be sensitive to the number of eigenvectors determining the normal subspace and anomalous subspace. It is difficult to pick a value for [k], in operation [4], so that normal and anomalous space may be separated.

The second issue is putting all of the features in one matrix while the features are of different natures and scales. For example, in one column, the [byte count] attribute may have a volume feature with relatively large values, and in the other column, the [entropy] attribute may have values that are relatively small. In this case, if the PCA operation is applied (used) over the data matrix, the information may be lost for the [entropy] attribute since this data may be very small in comparison to the data associated with the [byte count] attribute. The data for the [entropy] attribute may disappear in the analysis as this data may not be large enough to play a meaningful role in the normal or anomalous subspaces. So, most of the anomalies may be lost which are determined by entropy data, such as port scans.

A solution to this problem offered by the prior art is to scale all the feature data by some value. But the PCA operation is also sensitive to the scaling of the data values. In other words, different scaling factors may result in different outcomes.

Moreover, at the end of the PCA operation, it may be required to compare the SPE (square prediction error) score of each time-bin with a threshold. Again, selecting a threshold may be problematic and influential in the outcome of the PCA operation. It will be appreciated that selecting a low threshold may result in a very large false positive rate, and selecting a high threshold may result in a high false negative rate. In general, it was observed that the dependency and sensitivity of the PCA operation is a challenge in anomaly detection using the PCA operation.

The main parameters of the PCA operation that affect the performance of the PCA operation are: (A) selecting the threshold value for identifying the normal subspace and the anomalous subspace, and (B) selecting the SPE threshold value for the detection of anomalies.

In view of the foregoing, it will be appreciated that there exists a need to mitigate at least in part problems associated with the detection of an anomaly associated with a network.

SUMMARY OF THE INVENTION

After much study of the known systems and methods along with experimentation, an understanding of the problem and its solution has been identified and articulated below.

A solution is provided that mitigates (at least in part) the known PCA operation. The solution, to at least some of the problems associated with the PCA method (operation), is to use an iterative principal component analysis (I-PCA) operation, which reduces (at least in part) the sensitivity and dependency of the PCA operation approach to analysis of the network flow data parameters (attributes). The I-PCA operation may have a parameter, which is a stopping point of an iteration procedure.

For example, for the first iteration, the PCA operation is applied over a correlation matrix, and the first principal component is selected as the normal subspace. The SPE score is calculated, and then the time-bin with the maximum SPE score is picked as a suspicious point where there is a possibility of network anomaly. Then, the effect of that time-bin is removed by putting all the features of that time-bin equal to the mean value (or a value close to mean) of each feature. Afterwards, the PCA operation is applied again on the modified data matrix (such as, a network traffic matrix or data flow matrix). Since, in the modified data matrix, the values of the features associated with the suspicious time-bin are equal to the mean values, when the PCA operation is applied again, the effect of this suspicious time-bin may be removed from the data matrix.

For example, for the second (subsequent) iteration, similar to the first iteration, the SPE score is calculated and the time-bin with the largest SPE score is picked (marked) as a suspicious time-bin.

For subsequent iterations, this procedure (operation) is repeated (for a number of iterations). By selecting one principal component for each iteration as the normal subspace, the relatively larger anomalies may not have the opportunity to take part in the normal subspace.

As the algorithm progresses (iterates), the data matrix may be more monotonous in the sense that most of the data moves towards the normal behavior because the effect of the network anomalies at each iteration is removed from the data matrix.

The I-PCA operation is different from the PCA operations (methods) disclosed in the published literature. For instance, a first difference is as follows: the I-PCA operation provides an anomaly detection method which considers different traffic features of the traffic data; in sharp contrast, the operation (method) of published reference [1], published reference [2], and published reference [3] uses a network-wide value of a single feature.

A second difference is as follows: for the I-PCA operation, each iteration picks the eigenvector corresponding to the maximum eigenvalue as the normal space. The time-bin that is associated with the maximum SPE score is marked as a suspicious time-bin. This operation is completely different from the operation disclosed in published reference [1], published reference [2], and published reference [3] which do not follow an iterative approach. Instead, these published references execute the PCA operation a single time and find the top eigenvalues that contribute to 95% of the total variability in the data matrix, and then choose the corresponding eigenvectors as the normal space transformer.

A third difference is as follows: the PCA operation uses a threshold for detecting anomalies that is dependent to the input data. The I-PCA operation is different as the I-PCA operation is independent of the input data matrix, and therefore does not have the sensitivity problem with the PCA operation as reported in published reference [4]. This makes the I-PCA operation general and applicable in various anomaly detection environments.

A fourth difference is as follows: the I-PCA operation is also different from the method as disclosed in published reference [5] again due to the iterative framework of the I-PCA. Although published reference [5] uses the PCA operation with the multiple traffic feature, it is again using a single PCA operation and still has the sensitivity problem associated with the PCA operation. Moreover, published reference [5] uses a covariance matrix in the PCA operation which is different from the I-PCA operation which preferably uses a correlation matrix.

In order to mitigate, at least in part, the problem(s) identified with existing systems and/or methods for detection of an anomaly associated with a network, there is provided (in accordance with an aspect) a method 101 to be used on collected network data flow 116 associated with a network 100; the method 101 includes an anomaly-detection operation 103 including: (A) obtaining the collected network data flow 116; and (B) performing an iterative principal component analysis on the collected network data flow 116 to detect an anomaly associated with the collected network data flow 116.

In order to mitigate, at least in part, the problem(s) identified with existing systems and/or methods for detection of an anomaly associated with a network, there is provided (in accordance with an aspect) an apparatus 130 to be used on collected network data flow 116 associated with a network 100; the apparatus 130 includes a server 112, including a non-transitory computer-readable storage media 118. The non-transitory computer-readable media 118 includes an executable program 120 tangibly stored with the non-transitory computer-readable media 118, and the executable program 120 includes an anomaly-detection module 103A configured to direct the server 112 to: (A) obtain the collected network data flow 116; and (B) perform an iterative principal component analysis on the collected network data flow 116 to detect an anomaly associated with the collected network data flow 116.

In order to mitigate, at least in part, the problem(s) identified above, in accordance with an aspect, there is provided other aspects as identified in the claims.

According to one aspect of the invention, there is provided a method for detecting an anomaly in a network flow data, comprising:
using a processor for:
(a) collecting a network flow data within a time interval divided into multiple time-bins, and generating network flow features from the collected network data flow for each time-bin;
(b) generating input network traffic matrix containing information for the network flow features for respective time-bins;
(c) generating a statistical matrix from the input traffic matrix;
(d) applying a principal component analysis to the statistical matrix to determine one or more principal components of the statistical matrix;
(e) determining an anomaly score for each time-bin using the principal components;
(f) identifying one or more time-bin of the input network traffic matrix having highest anomaly scores;
(g) determining mean values for network flow features across all time-bins, excluding the identified time-bins;
(h) replacing values of the network flow features in the identified time-bins with respective determined mean values of said network flow features to form a modified input network traffic matrix;
(i) replacing the input network traffic matrix with the modified input network traffic matrix, and repeating the steps (c) to (f).

In the method described above, the statistical matrix is preferably a correlation matrix, but it also could be a covariance matrix. For simplicity, embodiments of the invention will be further described using the notion of a correlation matrix, but it is understood that a covariance matrix can be used instead of the correlation matrix.

The method further comprises associating the time-bin of the input network traffic matrix having a highest anomaly score with a potential network cyber-attack.

The method further comprises generating the network flow features selected from the list: number of bytes, number of packets, number of flows, number of source IP addresses, number of destination IP addresses, entropy of a source IP address, entropy of a destination IP address, DNS (domain name system) bytes, ICMP (Internet Control Message Protocol) bytes, IRC (Internet Relay Chat) bytes, Unique Source Port count, Unique Destination Port count, etc.

In the method described above, the determining the anomaly score comprises performing a projection of each time-bin with respect to an anomalous space mapping matrix, calculated using the principal components.

In the method described above, the determining the anomaly score comprises determining a square prediction error for each time-bin.

Preferably, the method further comprising repeating the steps (c) to (f) a predetermined number of times.

The method described above further comprises determining one or more data flows, identified by at least one attribute, contained within the identified time-bins of the input network traffic matrix.

In the method described above, the attribute may include an IP address, a port number of source, a port number of a destination for the one or more data flows, or another attribute that is common for the one or more data flows.

In the embodiments of the invention, in the method described above, the step (d) preferably comprises selecting a principal component having the highest value, and then determining remaining principal components in the following iterations.

Alternatively, in the method described above, the step (d) may comprise selecting two or more principal components having highest values, and then determining remaining principal components in the following iterations.

According to another aspect of the invention, there is provided a system for detecting an anomaly in a network flow data, comprising:
a processor;
a non-transitory computer readable storage medium having computer readable instructions stored thereon for execution by the processor, causing the processor to:
  (a) collect a network flow data within a time interval divided into multiple time-bins, and generate network flow features from the collected network data flow for each time-bin;
  (b) generate input network traffic matrix containing information for the network flow features for respective time-bins;
  (c) generate a statistical matrix from the input traffic matrix;
  (d) apply a principal component analysis to the statistical matrix to determine one or more principal components of the statistical matrix;
  (e) determine an anomaly score for each time-bin using the principal components;
  (f) identify one or more time-bin of the input network traffic matrix having highest anomaly scores;
  (g) determine mean values for network flow features across all time-bins, excluding the identified time-bins;
  (h) replace values of the network flow features in the identified time-bins with respective determined mean values of said network flow features to form a modified input network traffic matrix;
  (i) replace the input network traffic matrix with the modified input network traffic matrix, and repeat the steps (c) to (f).

In the system described above, the statistical matrix is a correlation matrix. Alternatively, the statistical matrix may be a covariance matrix.

In the system described above, the computer readable instructions further cause the processor to associate the time-bin of the input network traffic matrix having a highest anomaly score with a potential network cyber-attack.

In the system described above, the computer readable instructions further cause the processor to select the network flow features from the list of: number of bytes, number of packets, number of flows, number of source IP addresses, number of destination IP addresses, entropy of a source IP address, entropy of a destination IP address.

In the system described above, the computer readable instructions further cause the processor to perform a projection of each time-bin with respect to an anomalous space mapping matrix, calculated using the principal components, to determine the anomaly score.

In the system described above, the computer readable instructions further cause the processor to determine a square prediction error for each time-bin.

In the system described above, the computer readable instructions further cause the processor to repeat the steps (c) to (f) a predetermined number of times.

In the system described above, the computer readable instructions further cause the processor to determine one or more data flows, identified by at least one attribute, contained within the identified time-bin of the input network traffic matrix.

In the system described above, the attribute includes an IP address, a port number of source, or a port number of a destination for the one or more data flows.

In the system described above, the computer readable instructions further cause the processor to generate the input network traffic matrix containing information on attributes in addition to the network flow features.

In the system described above, the computer readable instructions further cause the processor to select a principal component having the highest value, and select remaining principal components in further iterations.

In the system described above, the computer readable instructions further cause the processor to select two or more principal components having highest values, and select remaining principal components in further iterations.

Thus, an improved method and system for detecting anomaly in network flow data using iterative principle component analysis have been provided.

Other aspects and features of the non-limiting embodiments may now become apparent to those skilled in the art upon review of the following detailed description of the non-limiting embodiments with the accompanying drawings.

DETAILED DESCRIPTION OF THE DRAWINGS

The non-limiting embodiments may be more fully appreciated by reference to the following detailed description of the non-limiting embodiments when taken in conjunction with the accompanying drawings, in which.

Figure 1A:
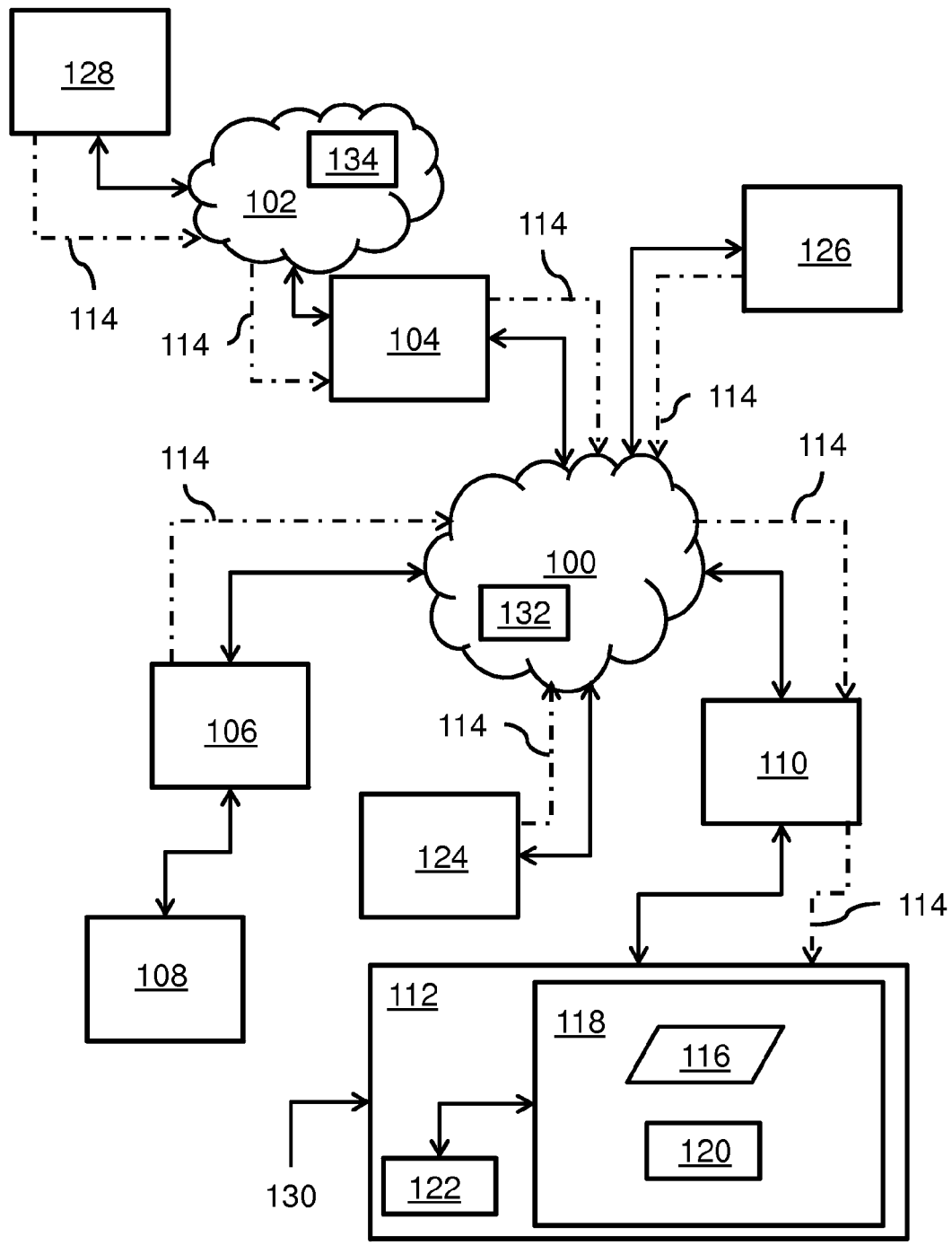
FIG. 1A (SHEET 1/10) depicts an example schematic of a network 100 having an anomaly-detection server 112.
Figure 1B:
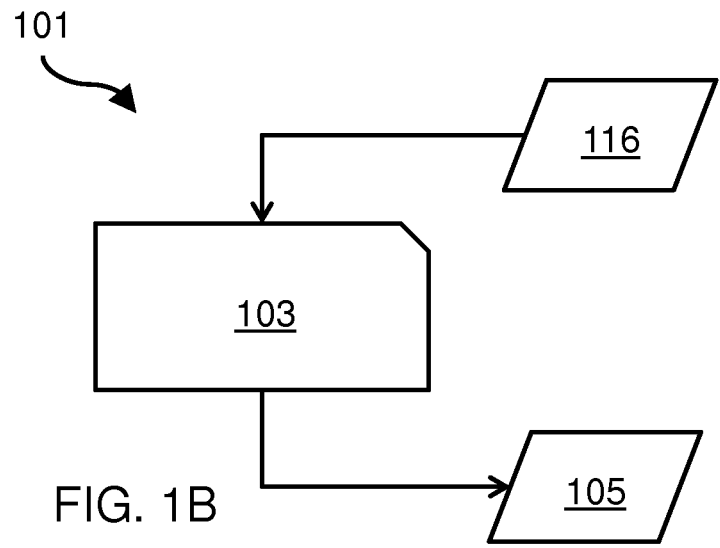
FIG. 1B (SHEET 2/10) depicts a first example schematic of a method 101 configured to direct operations of the anomaly-detection server 112 of FIG. 1A.
Figure 1C:
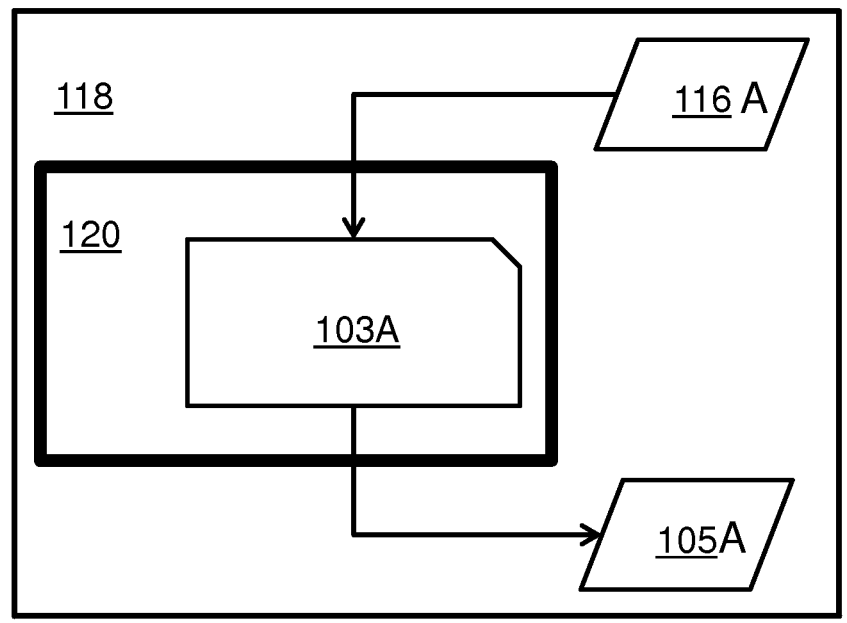
Figure 2A:
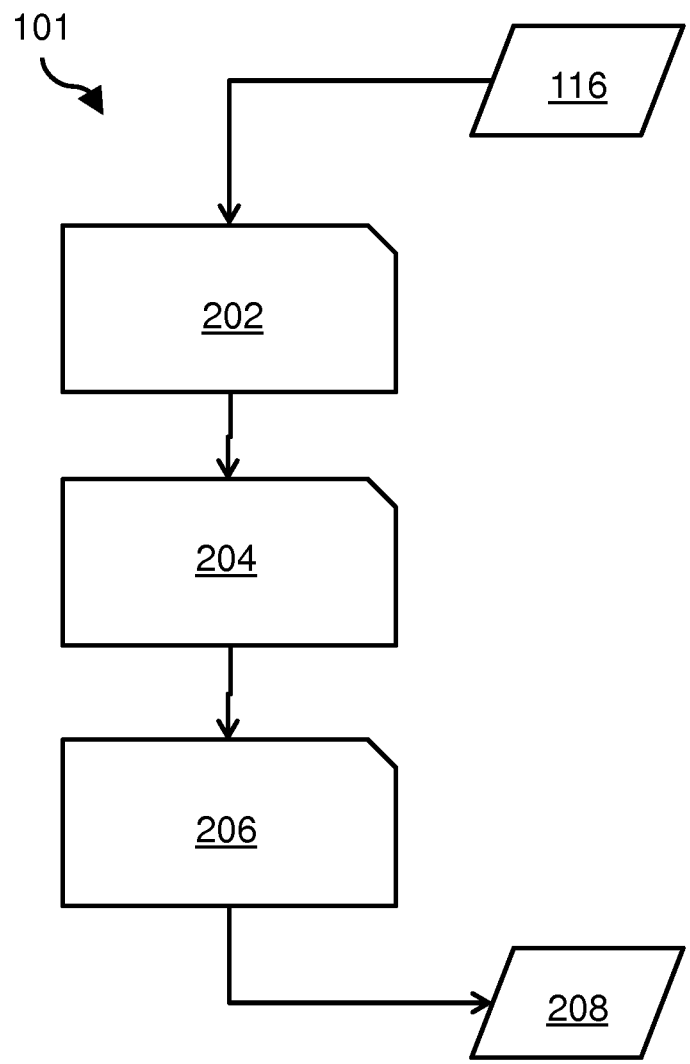
Figure 2B:
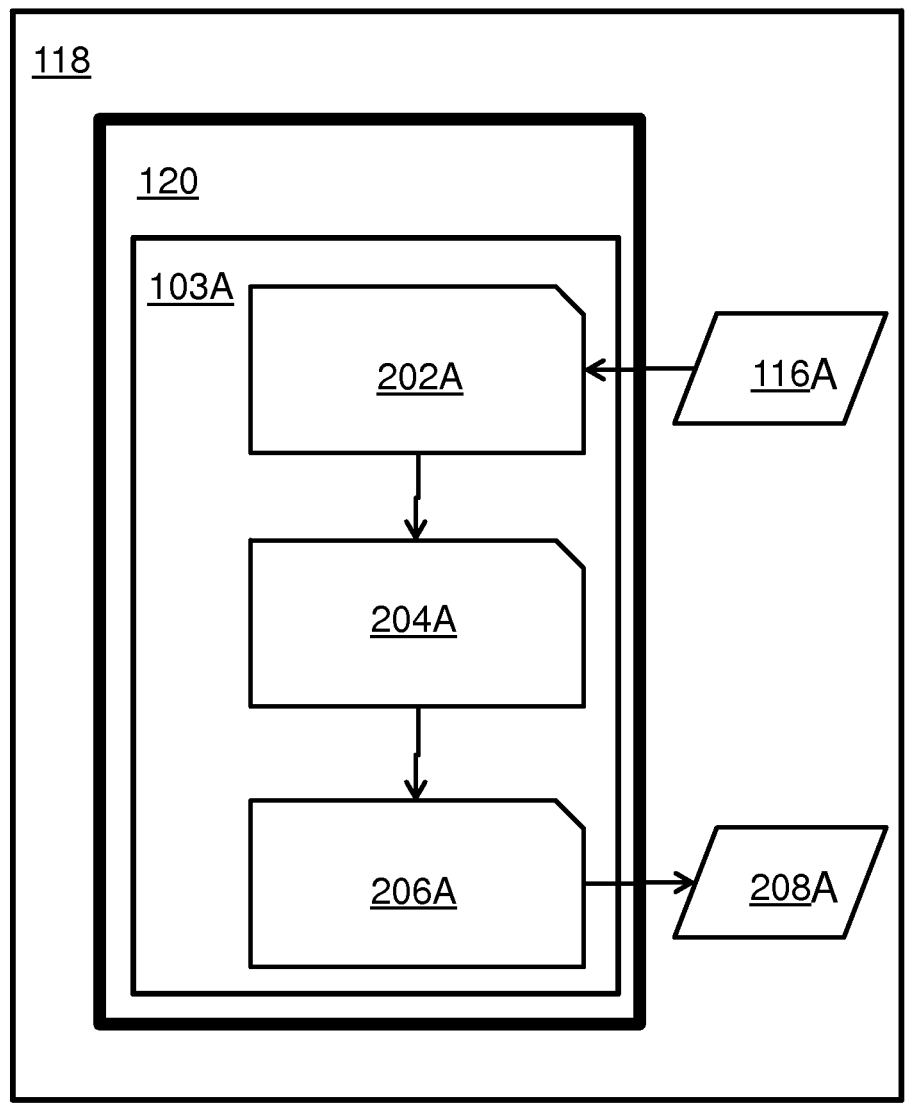
Figure 3A:
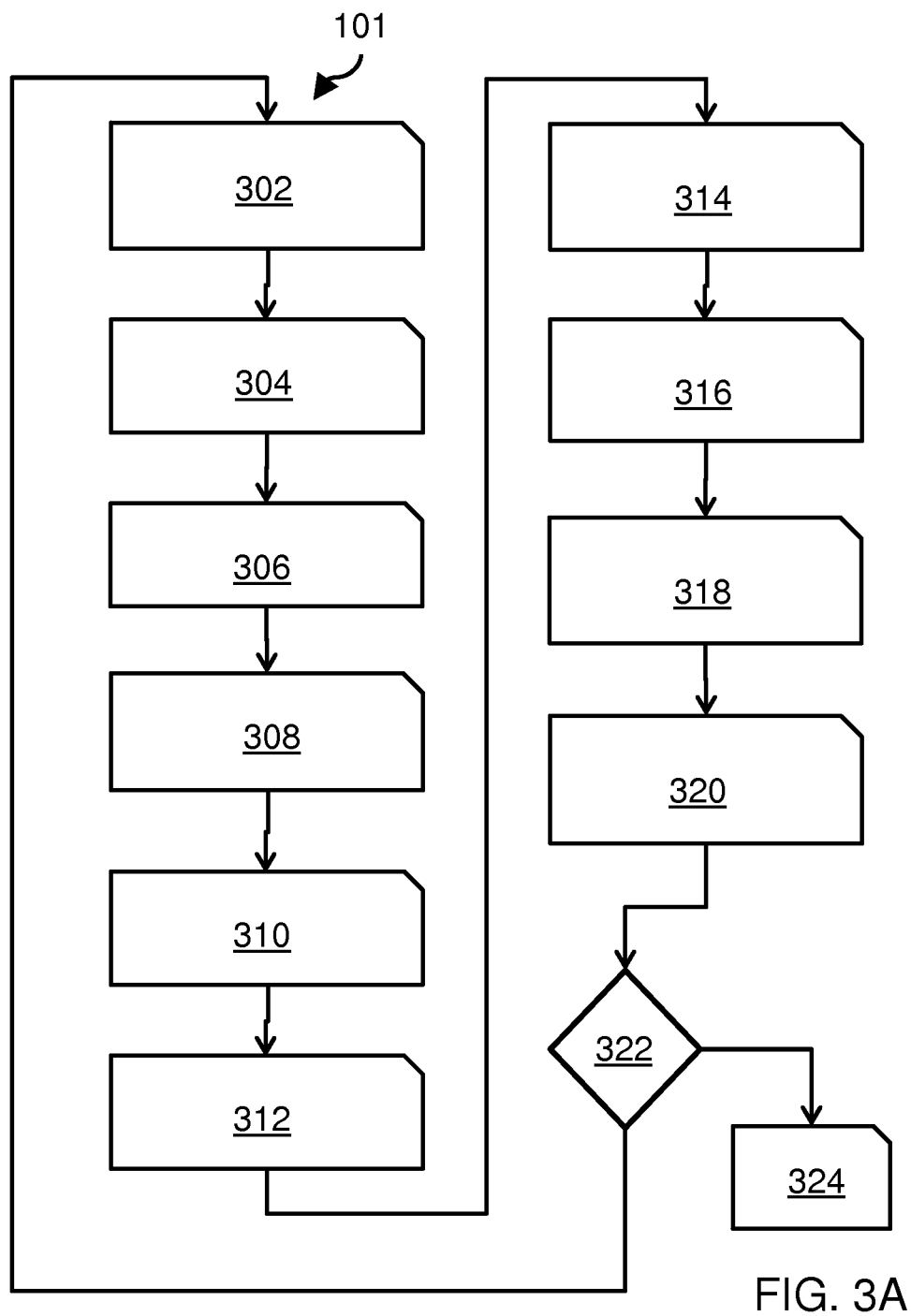
Figure 3B:
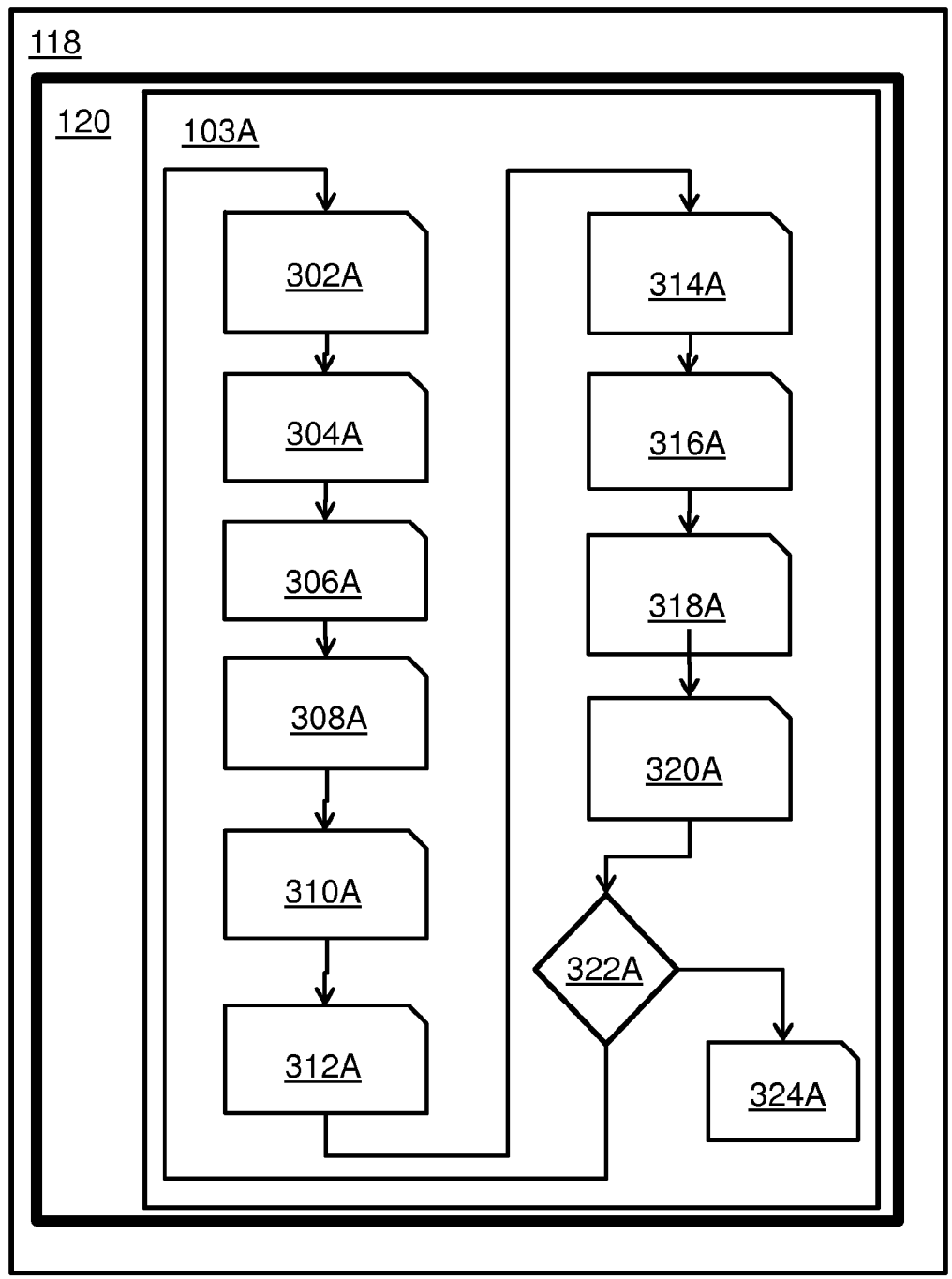
Figure 6:
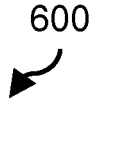
Figure 7:
Figure 8:

FIG. 1C (SHEET 2/10) depicts a first example schematic of an executable program 120 stored in a memory 118, and configured to direct operations of the anomaly-detection server 112 of FIG. 1A;

FIG. 2A (SHEET 3/10) depicts a second example schematic of a method 101 configured to direct operations of the anomaly-detection server 112 of FIG. 1A;

FIG. 2B (SHEET 4/10) depicts a second example schematic of an executable program 120 stored in a memory 118, and configured to direct operations of the anomaly-detection server 112 of FIG. 1A;

FIG. 3A (SHEET 5/10) depicts a third example schematic of a method 101 configured to direction operations of the anomaly-detection server 112 of FIG. 1A;

FIG. 3B (SHEET 6/10) depicts a third example schematic of an executable program 120 stored in a memory 118, and configured to direction operations of the anomaly-detection server 112 of FIG. 1A;

FIG. 4 (SHEET 7/10) depicts an example schematic of an input network traffic matrix 400 stored in a memory 118, and used in the method 101 of FIG. 3A;

FIG. 5 (SHEET 7/10) depicts an example schematic of a first iteration for a zero-mean traffic matrix 500 stored in a memory 118, and calculated by the method 101 of FIG. 3A;

FIG. 6 (SHEET 8/10) depicts an example schematic of an empirical correlation matrix 600 stored in a memory 118, and calculated by the method 101 of FIG. 3A;

FIG. 7 (SHEET 8/10) depicts an example schematic of eigenvalues 700 stored in a memory 118, and calculated by the method 101 of FIG. 3A;

FIG. 8 (SHEET 8/10) depicts an example schematic of eigenvectors 800 stored in a memory 118, and calculated by the method 101 of FIG. 3A;

FIG. 9 (SHEET 9/10) depicts an example schematic of a matrix [P] 900 stored in a memory 118, and generated by the method 101 of FIG. 3A;

FIG. 10 (SHEET 9/10) depicts an example schematic of an anomalous space-mapping matrix 1000 stored in a memory 118, and generated by the method 101 of FIG. 3A;

FIG. 11 (SHEET 10/10) depicts an example schematic of SPE scores 1100 stored in a memory 118, and generated by the method 101 of FIG. 3A; and FIG. 12 (SHEET 10/10) depicts an example schematic of a modified input matrix 1200 stored in a memory 118, and is generated by the method 101 of FIG. 3A.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating an understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 100 network
101 method
102 linking network
103A anomaly-detection module
103 anomaly-detection operation
104 network-linking router
105 indication of anomaly
105A module for generating indication of anomaly
106 network data-collecting router
108 data center
110 network data-flow router
112 anomaly-detection server, or server
114 network flow data
116 collected network flow data
116A module for collecting network flow data
118 non-transitory computer-readable media, or memory
120 executable program
122 processor assembly
124 destination server
126 source server
128 linking server
130 apparatus
132 network component
134 linking-network component
202A matrix-generating module
202 matrix-generating operation
204A iterative principal component analysis module
204 iterative principal component analysis operation
206A identification module
206 identification operation
208 indication data
208A module for indication of anomaly
302A input matrix-generating module
302 input matrix-generating operation
304A matrix-calculation module
304 matrix-calculation operation
306A correlation-matrix calculation module
306 correlation-matrix calculation operation
308A eigenvalue-and-eigenvector calculation module
308 eigenvalue-and-eigenvector calculation operation
310A eigen-selection module
310 eigen-selection operation
312A matrix-generating module
312 matrix-generating operation
314A mapping module
314 mapping operation
316A anomaly-scoring module
316 anomaly-scoring operation
318A identifying module
318 identifying operation
320A removal module
320 removal operation
322A determination module
322 determination operation
324A attribute-identification module
324 attribute-identification operation
400 input network traffic matrix
500 zero-mean traffic matrix
600 empirical correlation matrix
700 eigenvalues
800 eigenvectors
1000 anomalous space-mapping matrix
1100 SPE scores
1200 modified input matrix

DETAILED DESCRIPTION OF THE NON-LIMITING EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a". The aspects (examples, alterations, modifications, options, variations, embodiments and any equivalent thereof) are described with reference to the drawings. It should be understood that the invention is limited to the subject matter provided by the claims, and that the invention is not limited to the particular aspects depicted and described.

FIG. 1A depicts an example schematic of a network 100 having an anomaly-detection server 112, or server 112, having a processor and a memory.

In accordance with a general aspect, the anomaly-detection server 112 for the network 100 includes (and is not limited to) a non-transitory computer-readable media 118 (hereafter referred to as a memory 118). The memory 118 is configured to tangibly store an executable program 120; the executable program 120 is executable by the anomaly-detection server 112; the executable program 120 includes (and is not limited to) an operation for directing the anomaly-detection server 112 to detect an anomaly associated with the network 100 by using iterative principal component analysis (hereafter referred to, from time to time, as I-PCA).

FIG. 1B depicts a first example schematic of a method 101 configured to direct operations of the anomaly-detection server 112 of FIG. 1A.

The method 101 is configured to be executed by the anomaly-detection server 112 of FIG. 1A. Specifically, the method 101 is depicted as a flow chart or a computer programming flow chart, and the method 101 is configured to direct the anomaly-detection server 112 of FIG. 1A to execute an anomaly-detection operation 103. In general terms, the method 101 is to be used on collected network data flow 116 (depicted in FIG. 1A); the method 101 includes (and is not limited to) the anomaly-detection operation 103 configured to detect an anomaly associated with the collected network data flow 116 by using iterative principal component analysis.

In accordance with an option, the method 101 is adapted in such a way that the anomaly that is detected is associated with a network cyber-attack (such as an attack that may be prosecuted against the network 100). It will be appreciated that other types of anomalies may be detectable by the method 101.

Referring to FIG. 1A, there is depicted a linking network 102 and a network 100. Any one of the linking network 102 and/or the network 100 may include (for example): a publicly-accessible network, the Internet, network sections of the Internet, a private network, an enterprise network, a virtual private network (VPN), and any combination and/or permutation thereof, etc.

Network flow data 114 (also called traffic data or network traffic data) flows through the network 100. The network flow data 114 may include a set of related packet streams. The network flow data 114 may be defined as a set of data packets in which some instances of the data packets may have (or may share) the same network attributes, such as: (A) a destination IP address of a destination server 124 (or computer that is the receiver of data); (B) a source IP address of a source server 126 (or computer that is the source or provider of data); (C) a destination port (of the destination server 124); (D) a destination protocol (of the destination server 124); (E) a source port (of the source server 126); and (F) a source protocol (of the source server 126), etc. The destination server 124 may be coupled directly to the network 100 or may be indirectly coupled to the network 100 via the linking network 102. It will be appreciated that the source server 126 may be coupled directly to the network 100 (as depicted in FIG. 1A) or may be indirectly coupled to the network 100 via the linking network 102 (in a manner that is similar to a linking server 128 that is coupled to the linking network 102). It is understood that IP address means Internet Protocol address. The various instances of the network components 132 (such as, routers, switches, hubs, etc.) of the network 100 are configured to export network flow data (periodically) in such a way that a set of attributes of each network data flow is made available to an anomaly-detection server 112 (which may be called a collector server or anything equivalent thereof). The various instances of the linking-network components 134 (such as, routers, switches, hubs, etc.) of the linking network 102 may be configured to operate in a manner that is similar to the network components 132. For example, the network attributes of the network data flow may include (and are not limited to): number of bytes, number of packets, start time of data flow, end time of data flow, etc.

The network flow data is chosen as a basis of the detection approach for two reasons: (A) aggregate information makes the approach scalable; and (B) standardization for flow data export is well accepted in deployed networks.

Referring to FIG. 1A, a network-linking router 104 is configured to operatively couple (connect) the linking network 102 to the network 100 (either directly or indirectly via an intermediary network and/or a set of intermediary networks). A network data-collecting router 106 is configured to: (A) operatively couple to the network 100; and (B) operatively couple to a data center 108. A network data-flow router 110 is configured to: (A) operatively couple to the network 100; and (B) operatively couple to the anomaly-detection server 112.

The anomaly-detection server 112 is configured to receive the network flow data 114 and to store the network flow data 114 into memory 118 in the form of collected network data flow 116. The anomaly-detection server 112 includes software and suitable computer hardware configured to respond to requests across a computer network (communications network, or network) to provide a network service. A server may be operated (run) on a dedicated computer, which is also often referred to as "the server", but many networked computers are capable of hosting servers. In many cases, a computer may provide several services and have several servers running. Servers operate within client-server architecture. A server may be implemented as computer programs configured to serve requests of other programs (the clients). Thus, the server performs some tasks on behalf of the clients. The clients may connect to the server through the network but may run on the same computer. In the context of Internet Protocol (IP) networking, a server is a program that operates as a socket listener. The server may provide a service across a network, either to private users inside a large organization or to public users via the Internet, etc.

The anomaly-detection server 112 includes the memory 118; the memory 118 is configured to tangibly store the executable program 120 (also called a computer-executable program). The executable program 120 is configured to provide instructions including operations that are configured to be executed by the anomaly-detection server 112, such as to be executed by a processor assembly 122 of the anomaly-detection server 112, etc. The executable program 120 includes executable code (instruction) compiled from source code having instructions written in a high-level computer programming language (such as C++, etc.); persons of skill in the art understand how to use these computer programming tools to manufacture the executable code based on the various examples of the operations included in the method 101 depicted in FIGS. 1B, 2 and 3.

The network flow data 114 is configured to include network flow data that is communicated through the network 100, and may include network flow data exchanged between the linking network 102 and the network 100.

The processor assembly 122 may include a central processing unit (CPU), which is also called a central processor unit. The processor assembly 122 may include electronic hardware configured to carry out the executable instructions (programmed instructions) of a computer program by performing arithmetical, logical, and input/output operations. The anomaly-detection server 112 may have more than one CPU (a multiprocessing arrangement). CPUs may include a microprocessor. Multiple CPUs may be provided on a single chip (called multi-core processors). The CPU may also include peripheral devices and other components (called a system on a chip or SoC). Components of the CPU may include an arithmetic logic unit (ALU) configured to perform arithmetical and logical operations, and a control unit (CU) configured to extract instructions from memory, decode the instructions, execute the instructions, and calling on the ALU when necessary. Not all computational systems rely on a central processing unit. An array processor or vector processor has multiple parallel computing elements, with no one unit considered the center. In the distributed computing model, problems are solved by a distributed interconnected set of processors.

Referring to FIG. 1A, the network data-collecting router 106 and the network-linking router 104 are configured to: (A) generate network flow data (flow data), and (B) transmit the network flow data that was generated to the anomaly-detection server 112. For example, as depicted in FIG. 1A, the network data-collecting router 106 is configured to: (A) generate network data flows associated with the data center 108; and (B) forward the network data flows that were generated to the anomaly-detection server 112. The network-linking router 104 is configured to: (A) generate network data flows exchanged between the linking network 102 and the network 100; and (B) to forward the network data flows that were generated to the anomaly-detection server 112. The anomaly-detection server 112 is configured to: (A) receive the network flow data 114 from the network-linking router 104 and the network data-collecting router 106 (and/or from any other device, etc.); (B) store the network data flow that was received as the collected network data flow 116 in the memory 118; (C) execute a reading operation configured to direct the anomaly-detection server 112 to read the collected network data flow 116 in the memory 118; (D) execute the method 101 having the anomaly-detection operation 103 (depicted in FIG. 1B) on the collected network data flow 116; and (E) execute a providing operation to provide an indication 105 of whether a potential anomaly exists in the collected network data flow 116; by way of example, the anomaly may be indicative of a cyber-attack (also called a network-attack) waged on (through) and/or against the network 100.

It will be appreciated that, in accordance with an option, the following configurations may be provided: (A) the source server 126 is configured for the network 100, and the source server 126 is configured to detect an anomaly associated with the collected network data flow 116 by using iterative principal component analysis; (B) the destination server 124 is configured for the network 100, and the destination server 124 is configured to detect an anomaly associated with the collected network data flow 116 by using iterative principal component analysis; (C) the anomaly-detection server 112 is configured for the network 100, and the anomaly-detection server 112 is configured to detect an anomaly associated with the collected network data flow 116 by using iterative principal component analysis; (D) the network component 132 is configured for the network 100, and the network component 132 is configured to detect an anomaly associated with the collected network data flow 116 by using iterative principal component analysis; (E) the linking server 128 is configured for the linking network 102, and the linking network 102 is configured to operatively link to the network 100, and the linking server 128 is configured to detect an anomaly associated with the collected network data flow 116 by using iterative principal component analysis; and/or (F) the linking-network component 134 is configured for the linking network 102, and the linking-network component 134 is configured to detect an anomaly associated with the collected network data flow 116 by using iterative principal component analysis.

FIG. 1C depicts a first example of a system for detecting anomaly in a network flow data, comprising an executable program 120 stored in a memory 118, configured to direct operations of the anomaly-detection server 112 of FIG. 1A. The system also comprises a module 116A for collecting network flow data, and a module 105A indicating the anomaly in the network flow data.

Persons of skill in the art understand the manner in which the executable program 120 may be assembled (configured) to operate in accordance with the method 101 depicted in FIG. 1B, by using computing tools (such as, computer programming language, compilers, linkers, etc.). The executable program 120 depicted in FIG. 1C may include an anomaly-detection module 103A having modules (units of executable code).

FIG. 2A depicts a second example schematic of a method 101 configured to direct operations of the anomaly-detection server 112 of FIG. 1A.

The method 101 is depicted as a flow chart or a computer programming flow chart that has operations that are formed as executable programmed code (also called modules) configured to be executed by the anomaly-detection server 112 of FIG. 1A.

In accordance with an option, the anomaly-detection server 112 is configured to: (A) analyze network flow data associated with the network 100; (B) detect an anomaly (such as, a cyber-attack) based on the network flow data that was analyzed; and (C) provide an indication as to whether there is a possible anomaly (such as, cyber-attack waged on) associated with the network 100 based on the detection resulting from application of the I-PCA operation performed on the collected network data flow 116 of FIG. 1A.

The anomaly-detection operation 103 of FIG. 1B includes a matrix-generating operation 202 configured to direct (instruct) the anomaly-detection server 112 to: (A) extract network data flow features from the collected network data flow 116 (FIG. 1A) associated with the network 100; and (B) generate a network-traffic matrix based on the network data flow features that were extracted from the collected network data flow 116. The network-traffic matrix is hereafter referred to as the traffic matrix. Specifically, the matrix-generating operation 202 is further configured to direct (instruct) the anomaly-detection server 112 to: (A) divide a total time interval into multiple time-bins, (B) generate network flow features from the collected network data flow 116 for each time-bin; and (C) generate the traffic matrix having the network flow features. Operational control is then passed over to an iterative principal component analysis operation 204 (FIG. 2A). Examples of the matrix are provided in association with the example of the method 101 depicted in FIG. 3A.

The anomaly-detection operation 103 of FIG. 1B further includes the iterative principal component analysis operation 204 (FIG. 2A) configured to direct (instruct) the anomaly-detection server 112 to apply the I-PCA operation (algorithm) to identify anomalous time slots in the network traffic matrix (traffic matrix) that was generated by matrix-generating operation 202. Specifically, the iterative principal component analysis operation 204 is further configured to direct (instruct) the anomaly-detection server 112 to find (identify) an approximate time interval where the potential cyber-attacks may have occurred. This operation is configured to narrow the search space for cyber-attacks in view of the potentially large amount of network flow data that may be collected in the collected network data flow 116 of FIG. 1. For example, in an eight hour trace, it may be beneficial to have the search configured to be narrowed on a five-minute time window. This operation may be performed by applying the I-PCA algorithm on the traffic matrix that was generated by matrix-generating operation 202. Operational control is then passed over to an identification operation 206 of FIG. 2A.

The anomaly-detection operation 103 of FIG. 1B further includes the identification operation 206 (FIG. 2A) configured to direct (instruct) the anomaly-detection server 112 to identify the attributes of the collected network data flow 116 (such as, the IP addresses, etc.) that are contributing to time slots that were identified as having an anomaly (that may be, for instance, indicative of a possible network cyber-attack). Specifically, the identification operation 206 is further configured to direct (instruct) the anomaly-detection server 112 to identify, once a time window is detected, the attributes of the network flow data (such as, a set of IP addresses, etc.) that are contributing to the feature anomaly of a suspicious timeslot. The identification operation 206 is further configured to direct (instruct) the anomaly-detection server 112 to provide an indication data 208 configured to indicate possible cyber-attacks on the network 100. The indication data 208 is provided by the anomaly-detection server 112 of FIG. 1A, and may be stored to the memory 118 of FIG. 1A, if so desired. Operational control is then passed over to the matrix-generating operation 202 (if so desired) of FIG. 2A.

The network flow data 114 is generated by components or assemblies of the network 100 (such as, routers and switches). The anomaly-detection server 112 is configured to (continually) receive the network flow data 114. The anomaly-detection server 112 is configured to: (A) process the network flow data 114, and (B) generate network data flow features for each time-bin. For example, a time-bin may be of duration of five minutes or less. A time period is selected for computation of the I-PCA operation. A time period may include several time-bins. For example, a two hour time period may include 96 time-bins of 75 seconds in duration, however it is understood that the time period may include a different number of hours or minutes, which may be divided into a different number of time-bins of different durations, as required. The I-PCA operation is configured to identify a relatively smaller number of anomalous time-bins. The I-PCA operation may be computed (executed) at regular intervals over a time period. In accordance with an option, a set of time-bins may be added and an equal number of time-bins may be removed. For example, for every fifteen minutes of computation of the I-PCA operation, twelve time-bins (75 seconds in duration each) may be added and may be removed from the last time period. The output of the I-PCA operation may identify a relatively smaller number of anomalous time-bins. The type of cyber-attack and associated IP addresses may be identified based on the analysis of the suspicious time-bins that were identified by the I-PCA operation.

Network Flow Data Features

The network flow data 114 is data generated by the network components 132 (routers and switches) of the network 100. The network flow data 114 is collected over time, and is stored (in the memory 118 of FIG. 1A) as the collected network data flow 116. The network flow data 114 may include data provided by any xFlow™ based protocol, where xFlow can be (but not limited to) Netflow™, Sflow™, Jflow™, IPFix™, etc. The anomaly-detection server 112 is configured to generate a traffic matrix having [m] flow features over a time period [t] based on the collected network data flow 116. The network flow data could be considered as random variables having Gaussian distribution. Therefore various matrices generated by the system and method of the embodiments of the invention could be considered as statistical matrices such as covariance matrix, correlation matrix etc.

Examples of various flow data features (attributes) that may be inserted into the traffic matrix are: bytes, packets, number of flows, source IP address count, destination IP address count, source IP address entropy, destination IP address entropy, DNS (domain name system) bytes, ICMP (Internet Control Message Protocol) bytes, IRC (Internet Relay Chat) bytes, Unique Source Port count, Unique Destination Port count.

Entropy, H(X), may be defined by the following formula, as follows:

$$H(X) = -\sum_{i=1}^{N} p(x_i)\log_2 p(x_i)$$

where p(x) is the probability of occurrence of an IP address in a time-bin, and N is the total number of IPs (IP addresses).

Entropy (network entropy) indicates dispersion or concentration in a distribution. It will be appreciated that there may be many other network flow data features.

For instance, the traffic matrix may be divided into [n] time-bins. The duration of time period [t] may be, for example, the duration of time between one to 24 hours. Traffic flow features are represented as an [m×n] input network traffic matrix 400. The anomaly-detection server 112 is configured to execute the I-PCA operation in order to detect which of the [n] time-bins may have potential anomalous events indicative of a cyber-attack on the network 100. Anomalous instances of the time-bins may be further inspected to pinpoint the IP address(es) and associated cause for the detected anomaly in a particular time-bin.

FIG. 2B depicts a second example of a system for detecting the anomaly in a network flow data, comprising an executable program 120 stored in a memory 118, and configured to direct operations of the anomaly-detection server 112 of FIG. 1A. The system also comprises a module 116A for collecting network flow data, and a module 208A for indicating the anomaly in the network flow data.

Persons of skill in the art understand the manner in which the executable program 120 may be assembled (configured) to operate in accordance with the method 101 depicted in FIG. 2A, by using computing tools (such as, computer programming language, compilers, linkers, etc.). The executable program 120 depicted in FIG. 2B includes the anomaly-detection module 103A having modules (units of executable code), such as the following modules: a matrix-generating module 202A; an iterative principal component analysis module 204A; and an identification module 206A, all of which correspond (respectively) to the following operations depicted in FIG. 2A: the matrix-generating operation 202; the iterative principal component analysis operation 204; and the identification operation 206.

FIG. 3A depicts a third example schematic of a method 101 configured to direction operations of the anomaly-detection server 112 of FIG. 1A.

The method 101 (also called an iterative principal component analysis method or an iterative principal component analysis operation) includes a combination of: an input matrix-generating operation 302; a matrix-calculation operation 304; a correlation-matrix calculation operation 306; an eigenvalue and eigenvalue-and-eigenvector calculation operation 308; an eigen-selection operation 310; a matrix-generating operation 312; a mapping operation 314; an anomaly-scoring operation 316; an identifying operation 318; a removal operation 320; a determination operation 322; and an attribute-identification operation 324.

The input matrix-generating operation 302 is configured to direct (instruct) the anomaly-detection server 112 to generate (provide or create) an [m×n] input network traffic matrix 400 (such as, a network-traffic matrix) including attributes extracted from data associated with the collected network data flow 116 (depicted in FIG. 1). It is understood that [m] is the number of rows of the matrix, and [n] is the number of columns of the matrix. The [m×n] input network traffic matrix 400 includes attributes extracted (taken) from the data associated with the collected network data flow 116 of FIG. 1.

FIG. 3B depicts a third example schematic of an executable program 120 stored in a memory 118, and configured to direction operations of the anomaly-detection server 112 of FIG. 1A.

Persons of skill in the art understand the manner in which the executable program 120 may be assembled (configured) to operate in accordance with the method 101 depicted in FIG. 3A, by using computing tools (such as, computer programming language, compilers, linkers, etc.). The executable program 120 depicted in FIG. 3B includes the anomaly-detection module 103A having the following modules (units of executable code), such as: an input matrix-generating module 302A; a matrix-calculation module 304A; an eigenvalue and eigenvalue-and-eigenvector calculation module 308A; an eigen-selection module 310A; a matrix-generating module 312A; a mapping module 314A; an anomaly-scoring module 316A; an identifying module 318A; a removal module 320A; a determination module 322A; and an attribute-identification module 324A, all of which correspond (respectively) to the following operations depicted in FIG. 3A: the input matrix-generating operation 302; the matrix-calculation operation 304; the correlation-matrix calculation operation 306; the eigenvalue and eigenvalue-and-eigenvector calculation operation 308; the eigen-selection operation 310; the matrix-generating operation 312; the mapping operation 314; the anomaly-scoring operation 316; the identifying operation 318; the removal operation 320; the determination operation 322; and the attribute-identification operation 324.

FIG. 4 depicts an example schematic of an input network traffic matrix 400 stored in a memory 118, and used in the method 101 of FIG. 3A. Depicted are four features and six time-bins.

Operational control is passed over to the matrix-calculation operation 304 of FIG. 3A.

Referring to FIG. 3A, the matrix-calculation operation 304 is configured to direct (instruct) the anomaly-detection server 112 to calculate a zero-mean traffic matrix 500 using the [m×n] input network traffic matrix 400 (depicted in FIG. 4) that was calculated by the input matrix-generating operation 302; the zero-mean traffic matrix 500 (depicted in FIG. 5) that is generated has a mean zero for each column of the zero-mean traffic matrix 500.

FIG. 5 depicts an example schematic of a first iteration for a zero-mean traffic matrix 500 stored in a memory 118, and calculated by the method 101 of FIG. 3A. According to the method 101, we deduct the mean of each column from each on the elements in that column. For example, we calculate the mean of column one and then this amount is deducted from each of the elements of column one. The same operation is repeated for other columns.

Operational control is passed over to the correlation-matrix calculation operation 306 of FIG. 3A.

Referring to FIG. 3A, the correlation-matrix calculation operation 306 is configured to direct the anomaly-detection server 112 to calculate an empirical correlation matrix 600 (for the zero-mean traffic matrix 500 of FIG. 4 that was calculated by the matrix-calculation operation 304).

FIG. 6 depicts an example schematic of an empirical correlation matrix 600 stored in a memory 118, and calculated by the method 101 of FIG. 3A. The empirical correlation matrix is derived by calculating the correlation coefficient for any two features x and y:

$$r_{xy} = \frac{\sum_{i=1}^{n}(x_i - \bar{x})(y_i - \bar{y})}{(n-1)s_x s_y} = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}},$$

Obviously the correlation coefficient of each feature with itself is 1. That's is why the elements of the main diagonal of the matrix is just one.

Operational control is passed over to the eigenvalue-and-eigenvector calculation operation 308 of FIG. 3A.

Referring to FIG. 3A, the eigenvalue and eigenvalue-and-eigenvector calculation operation 308 is configured to direct the anomaly-detection server 112 to calculate the eigenvalues 700 and the eigenvectors 800 associated with the empirical correlation matrix 600 that was calculated by the correlation-matrix calculation operation 306. Correlation refers to any of a broad class of statistical relationships involving dependence.

A matrix [A] acts on a vector [x]; action means multiplication; a new vector is generated, [y]=[A]×[x]. The matrix [A] acting on a vector [x] does two things to the vector [x]: The matrix [A] scales the vector [x], and rotates the vector [x]. For the matrix [A], there are some favored vectors/directions. When the matrix [A] acts on these favored vectors, the action essentially results in just scaling the vector, and there is no rotation. These favored vectors are the eigenvectors, and the amount by which each of these favored vectors stretches or compresses is the eigenvalue. Consider the eigenvector corresponding to the maximum (absolute) eigenvalue. If a vector is taken along this eigenvector, then the action of the matrix [A] is maximum. No other vector when acted on by the matrix [A] will get stretched as much as this eigenvector. Hence, if a vector were to lie close to this eigen direction, then the effect of action by the matrix [A] will be large (that is, the action by the matrix [A] results in a large response for the vector). The effect of the action by the matrix [A] is high for large (absolute) eigenvalues, and is less for small (absolute) eigenvalues. Hence, the directions/vectors along which this action is high are called the principal directions or principal eigenvectors. The corresponding eigenvalues are called the principal values.

FIG. 7 depicts an example schematic of eigenvalues 700 stored in a memory 118, and calculated by the method 101 of FIG. 3A. Eigenvalue and eigenvector calculation is performed over the correlation matrix and the outcome of this operation is eigenvalues (listed in a vector depicted in FIG. 7) and eigenvectors (listed in a matrix depicted in FIG. 8 by concatenating them together)

FIG. 8 depicts an example schematic of eigenvectors 800 stored in a memory 118, and calculated by the method 101 of FIG. 3A. Eigenvalue and eigenvector calculation is performed over the correlation matrix and the outcome of this operation is eigenvalues (listed in a vector depicted in FIG. 7) and eigenvectors (listed in a matrix depicted in FIG. 8 by concatenating them together)

Operational control is passed over to the eigen-selection operation 310 of FIG. 3A.

Referring to FIG. 3A, the eigen-selection operation 310 is configured to direct the anomaly-detection server 112 to select a relatively higher principal component (preferably, the highest principal component) as the normal subspace. The relatively higher (preferably, the highest) principal component and corresponding eigenvector form a mapping of normal subspace of the empirical correlation matrix 600 (depicted in FIG. 6). Operational control is passed over to the matrix-generating operation 312 of FIG. 3A.

Referring to FIG. 3A, the matrix-generating operation 312 is configured to direct the anomaly-detection server 112 to generate (create) the matrix [P] by putting the principal eigenvectors together (selected or selectable from the eigen-selection operation 310). It is noted that the remaining eigenvectors (the non-principal eigenvectors) constitute the mapping of the anomalous subspace.

FIG. 9 depicts an example schematic of a matrix [P] 900 stored in a memory 118, and generated by the method 101 of FIG. 3A. The eigenvector associated to the largest eigenvalue is chosen as a principal component. So, matrix 900 will be the first column of matrix 800.

Operational control is passed over to the mapping operation 314 of FIG. 3A.

Referring to FIG. 3A, the mapping operation 314 is configured to direct the anomaly-detection server 112 to map the [m×n] input network traffic matrix 400 into the anomalous space, by using the following formula, as follows:

$$\tilde{x} = (I - PP^T)x$$

FIG. 10 depicts an example schematic of an anomalous space-mapping matrix 1000 stored in a memory 118, and generated by the method 101 of FIG. 3A.

Once the formula (above) has been executed (calculated), then operational control is passed over to the anomaly-scoring operation 316 of FIG. 3.

Referring to FIG. 3A, the anomaly-scoring operation 316 is configured to direct the anomaly-detection server 112 to calculate an anomaly score for each time-bin of the [m×n] input network traffic matrix 400. The anomaly score may be calculated in several ways. One way is to: (A) perform a projection of each feature [m×n] input network traffic matrix 400; and (B) calculate an anomaly score for each time-bin of the [m×n] input network traffic matrix 400. Another way is to calculate the anomaly score for each time-bin by finding the square prediction error (SPE), such as by using the following formula, as follows:

$$\|\tilde{x}\|^2$$

FIG. 11 depicts an example schematic of SPE scores 1100 stored in a memory 118, and generated by the method 101 of FIG. 3A. By way of example, the maximum SPE equals 2.0096, and the first suspicious time-bin equals six.

Once the above formula has been executed (calculated or computed), then operational control is passed over to the identifying operation 318 of FIG. 3A.

Referring to FIG. 3A, the identifying operation 318 is configured to direct the anomaly-detection server 112 to identify a time-bin of the [m×n] input network traffic matrix 400 that has a relatively higher anomaly score (such as a maximum anomaly score) that may be potentially indicative of a suspicious network anomaly. For example, the identifying operation 318 may be configured to direct the anomaly-detection server 112 to select the time-bin with the maximum SPE score as a suspicious point. Operational control is passed over to the removal operation 320 of FIG. 3A.

Referring to FIG. 3A, the removal operation 320 is configured to direct the anomaly-detection server 112 to remove the effect of the identified time-bin that was identified by the identifying operation 318 (the time-bin that has the maximum anomaly score as indicated in the identifying operation 318) by replacing the features in the identified time-bin with the mean value (thereby reducing the effect of the identified time-bin). Specifically, the removal operation 320 is configured to direct the anomaly-detection server 112 to remove the effect of the identified time-bin from the [m×n] input network traffic matrix 400 by replacing the features (attributes) of that time-bin with those equal to the mean value of each feature (excluding the suspicious time-bin), and this then forms or generates a modified [m×n] input network traffic matrix 400 (used for the next iteration of the method 101).

The input network traffic matrix 400 of FIG. 4 is modified by replacing the suspicious row with the mean values, or values that are close to the mean values. For example, the values that close to the mean values may be preferably within 2-5% deviation from the mean values, or less preferably within 5-10% deviation from the mean values, and yet less preferably within 10%-30% deviation from the mean values. In this application the term "mean value" will mean both the mean value and a value that is close to the mean value.

It will be appreciated that this is the modified input matrix to be used for the second iteration of the method 101 of FIG. 3A starting at the input matrix-generating operation 302 (for the case where another iteration is required).

Operational control is passed over to the determination operation 322 of FIG. 3A.

Referring to FIG. 3A, the determination operation 322 is configured to direct the anomaly-detection server 112 (of FIG. 1) to provide the modified [m×n] input network traffic matrix 400 (generated by the removal operation 320) to the input matrix-generating operation 302 for a next iteration of the method 101 for the case where an additional iteration is required. Specifically, the determination operation 322 is configured to direct the anomaly-detection server 112 to determine whether another iteration (from the input matrix-generating operation 302 to the determination operation 322) is (and is not) required. For the case where next iteration (of the method 101 of FIG. 3A) is required, the input matrix-generating operation 302 may use (input) the modified data matrix generated by the removal operation 320. It will be appreciated that the point for stopping the iteration may be set to a fixed value (if so desired). For the case where another iteration (of the method 101) is not required, then operational control is passed over to the attribute-identification operation 324 of FIG. 3A.

Referring to FIG. 3A, the attribute-identification operation 324 is configured to direct the anomaly-detection server 112 to identify (provide) an attribute (or attributes) associated with data of the collected network data flow 116 (FIG. 1) (such as, the IP addresses, etc.) that are contained within the time-bins of the [m×n] input network traffic matrix 400 that are marked as suspicious by the identifying operation 318.

The attribute-identification operation 324 may permit identification of the root cause of an anomaly detected by the method 101 of FIG. 3A, such as to identify a type of a network-adverse event (such as, a network cyber-attack, etc.), and an attribute (such as, IP addresses) associated with the network-adverse event (the network cyber-attack). It will be appreciated that operational control may be passed over to the input matrix-generating operation 302 (if so desired).

FIG. 12 (SHEET 10/10) depicts an example schematic of a modified input network traffic matrix 1200 stored in a memory 118, and is generated by the method 101 of FIG. 3A. Modified input network traffic matrix 1200 is the input network traffic matrix 400 except that the element of the last row (which is corresponding to the first suspicious time-bin, i.e., time-bin 6) is replaced with the arithmetic mean of the corresponding column in the input network traffic matrix 400.

Various approaches are possible for identifying the IP addresses from the network flow data. Two examples are as follows.

One example provides a heuristic based operation: various database queries may be performed at the chosen time-bin (associated with the identifying operation 318 of FIG. 3A) to identify an attribute of the network flow data (such as an IP address or a set of IP addresses). The type of database query may depend on the network flow data feature that is suspected to be anomalous. For example, for the case where the time-bin detected is due to a flow data feature of a relatively large number of bytes, then the database query may identify the IP addresses which are associated with the relatively large number of bytes. For the case where the flow data feature is a large number of flows, then the database query may pick the IP address which is communicating with a large number of IP addresses, etc. Different database queries are performed with different flow data feature anomalies. Thus, the root cause may be identified in this manner. Such a heuristic based approach may eliminate false positives for the case where nothing notable is found after issuing the database query.

Another example provides usage of the I-PCA operation on a statistical matrix. The I-PCA operation (algorithm) of the examples of the method 101 may be applied inside a time-bin. The input matrix may be different for this case. The input matrix may include a list of attributes, such as IP addresses and flow features. By applying the I-PCA operation on the input matrix, a set of IP addresses may be identified along with the flow feature that is anomalous in nature.

Other approaches, such as clustering, may be additionally used. A combination of the above mentioned approaches may be used to identify details of a network anomaly (an attack detail).

For convenience of the reader, a summary of the above described embodiment of the invention is provided below.

The method 101 of the embodiments of the invention is used on collected network data flow 116 associated with a network 100, the method 101 comprising:
an anomaly-detection operation 103 including:
obtaining the collected network data flow 116; and
performing an iterative principal component analysis on the collected network data flow 116 to detect an anomaly associated with the collected network data flow 116.

In the method 101, the anomaly that is detected by the anomaly-detection operation 103 is associated with a network cyber-attack.

In the method described above, the anomaly-detection operation 103 further includes:
a matrix-generating operation 202 including:
extracting network data flow features from the collected network data flow 116; and
generating a network-traffic matrix based on network data flow features that were extracted from the collected network data flow 116.

In the method described above, the matrix-generating operation 202 further includes: dividing a total time interval into multiple time-bins;
generating network flow features from the collected network data flow 116 for each time-bin; and
generating the network-traffic matrix having network flow features.

In the method described above, the anomaly-detection operation 103 further includes:
an iterative principal component analysis operation 204 including:
applying the iterative principal component analysis operation to identify anomalous time slots in the network-traffic matrix that was generated by the matrix-generating operation 202.

In the method described above, the iterative principal component analysis operation 204 further includes finding an approximate time interval where potential cyber-attacks may have occurred.

In the method described above, the anomaly-detection operation 103 further includes an identification operation 206 including identifying attributes of the collected network data flow 116 that are contributing to time slots that were identified as having an anomaly.

In the method described above, the identification operation 206 further includes identifying, once a time window is detected, attributes of the collected network data flow 116 that are contributing to a feature anomaly of a suspicious time-slot.

In the method described above, the identification operation 206 further includes providing an indication data 208 configured to indicate a possible network cyber-attack.

In the method described above, the anomaly-detection operation 103 further includes an input matrix-generating operation 302, generating an [m×n] input network traffic matrix 400 including attributes extracted from data associated with the collected network data flow 116.

In the method described above, the anomaly-detection operation 103 further includes a matrix-calculation operation 304, calculating a zero-mean traffic matrix 500 by using the [m×n] input network traffic matrix 400 that was generated by the input matrix-generating operation 302.

In the method described above, the anomaly-detection operation 103 further includes a correlation-matrix calculation operation 306, calculating an empirical correlation matrix 600 for the zero-mean traffic matrix 500 that was calculated by the matrix-calculation operation 304.

In the method described above, the anomaly-detection operation 103 further includes an eigenvalue and eigenvalue-and-eigenvector calculation operation 308, calculating eigenvalues 700 and eigenvectors 800 associated with the empirical correlation matrix 600 that was calculated by the correlation-matrix calculation operation 306.

In the method described above, the anomaly-detection operation 103 further includes an eigen-selection operation 310, selecting a relatively higher principal component as a normal subspace, and the relatively higher principal component and corresponding eigenvector form a mapping of normal subspace of the empirical correlation matrix 600.

In the method described above, the anomaly-detection operation 103 further includes a matrix-generating operation 312, generating a matrix [P] by putting principal eigenvectors 800 together that are selectable from the eigen-selection operation 310.

In the method described above, the anomaly-detection operation 103 further includes a mapping operation 314, mapping the [m×n] input network traffic matrix 400 into an anomalous space.

In the method described above, the anomaly-detection operation 103 further includes an anomaly-scoring operation 316, calculating an anomaly score for each time-bin of the [m×n] input network traffic matrix 400.

In the method described above, the anomaly-detection operation 103 further includes an identifying operation 318, identifying a time-bin of the [m×n] input network traffic matrix 400 that has a relatively higher anomaly score that may be potentially indicative of a suspicious network anomaly.

In the method described above, the anomaly-detection operation 103 further includes a removal operation 320, removing an effect of the time-bin, which was identified by the identifying operation 318, from the [m×n] input network traffic matrix 400 by putting features of the time-bin equal to a mean value of each feature excluding a suspicious time-bin, thereby forming a modified [m×n] input network traffic matrix 400 to be used for a next iteration of the method 101.

In the method described above, the anomaly-detection operation 103 further includes a determination operation 322, providing the modified [m×n] input network traffic matrix 400 that was generated by the removal operation 320 to the input matrix-generating operation 302 for the next iteration of the method 101 for a case where an additional iteration is required.

In the method described above, the anomaly-detection operation 103 further includes an attribute-identification operation 324, identifying an attribute associated with data of the collected network data flow 116 that are contained within time-bins of the [m×n] input network traffic matrix 400 that are marked as suspicious by the identifying operation 318, for the case where another iteration of the method 101 is not required.

In the method described above, the anomaly that is detected by the anomaly-detection operation 103 is associated with a network-adverse event that is detected in association with the collected network data flow 116.

In the method described above, the anomaly that is detected is by the anomaly-detection operation 103 is associated with any one of:
- a network fraud being detected in association with the collected network data flow 116;
- a network intrusion being detected in association with the collected network data flow 116;
- a network fault being detected in association with the collected network data flow 116;
- a network-health condition being detected in association with the collected network data flow 116;
- a network-sensor event being detected in association with the collected network data flow 116;
- a network-adverse event being detected in association with the collected network data flow 116; and
- a banking-network adverse event being detected in association with the collected network data flow 116.

According to the embodiments of the invention, there is provided an apparatus 130 to be used on collected network data flow 116 associated with a network 100, the apparatus 130 comprising a server 112, including a non-transitory computer-readable storage media 118, including:
- an executable program 120 being tangibly stored with the non-transitory computer-readable media 118, and the executable program 120 including:
- an anomaly-detection module 103A being configured to direct the server 112 to:
- obtain the collected network data flow 116; and
- perform an iterative principal component analysis on the collected network data flow 116 to detect an anomaly associated with the collected network data flow 116.

In the apparatus described above, the anomaly-detection module 103A is further configured to determine that the anomaly that is detected is associated with a network cyber-attack.

In the apparatus described above, the anomaly-detection module 103A includes a matrix-generating module 202A configured to extract network data flow features from the collected network data flow 116, and generate a network-traffic matrix based on the network data flow features that were extracted from the collected network data flow 116.

In the apparatus described above, the matrix-generating module 202A is further configured to divide a total time interval into multiple time-bins; generate network flow features from the collected network data flow 116 for each time-bin; and generate the network-traffic matrix having the network flow features.

In the apparatus described above, the anomaly-detection module 103A includes an iterative principal component analysis module 204A configured to apply the iterative principal component analysis to identify anomalous time slots in the network-traffic matrix that was generated by the matrix-generating module 202A.

In the apparatus described above, the iterative principal component analysis module 204A is further configured to find an approximate time interval where potential cyber-attacks may have occurred.

In the apparatus described above, the anomaly-detection module 103A further includes an identification module 206A configured to identify attributes of the collected network data flow 116 that are contributing to time slots that were identified as having an anomaly.

In the apparatus described above, the identification module 206A is further configured to identify, once a time window is detected, the attributes of the collected network data flow 116 that are contributing to a feature anomaly of a suspicious time-slot.

In the apparatus described above, the identification module 206A is further configured to provide an indication data 208 configured to indicate a possible network cyber-attack.

In the apparatus described above, the anomaly-detection module 103A further includes an input matrix-generating module 302A configured to generate an [m×n] input network traffic matrix 400 including attributes extracted from data associated with the collected network data flow 116.

In the apparatus described above, the anomaly-detection module 103A further includes a matrix-calculation module 304A configured to calculate a zero-mean traffic matrix 500 by using the [m×n] input network traffic matrix 400 that was generated by the input matrix-generating module 302A.

In the apparatus described above, the matrix-calculation module 304A is further configured to a correlation-matrix calculation module 306A configured to calculate an empirical correlation matrix 600 for the zero-mean traffic matrix 500 that was calculated by the matrix-calculation module 304A.

In the apparatus described above, the anomaly-detection module 103A further includes an eigenvalue and eigenvalue-and-eigenvector calculation module 308A configured to calculate eigenvalues 700 and eigenvectors 800 associated with the empirical correlation matrix 600 that was calculated by the correlation-matrix calculation module 306A.

In the apparatus described above, the anomaly-detection module 103A further includes an eigen-selection module 310A configured to select a relatively higher principal component as a normal subspace, and the relatively higher principal component and corresponding eigenvector form a mapping of normal subspace of the empirical correlation matrix 600.

In the apparatus described above, the anomaly-detection module 103A further includes a matrix-generating module 312A configured to generate a matrix [P] by putting principal eigenvectors 800 together that are selectable from the eigen-selection module 310A.

In the apparatus described above, the anomaly-detection module 103A further includes a mapping module 314A configured to map the [m×n] input network traffic matrix 400 into an anomalous space.

In the apparatus described above, the anomaly-detection module 103A further includes an anomaly-scoring module 316A configured to calculate an anomaly score for each time-bin of the [m×n] input network traffic matrix 400.

In the apparatus described above, the anomaly-detection module 103A further includes an identifying module 318A configured to identify a time-bin of the [m×n] input network traffic matrix 400 that has a relatively higher anomaly score that may be potentially indicative of a suspicious network anomaly.

In the apparatus described above, the anomaly-detection module 103A further includes a removal module 320A configured to remove an effect of the time-bin, which was identified by the identifying module 318A, from the [m×n] input network traffic matrix 400 by putting features of the time-bin substantially equal to a mean value of each feature excluding a suspicious time-bin, thereby forming a modified [m×n] input network traffic matrix 400 to be used for a next iteration of the method 101.

In the apparatus described above, the anomaly-detection module 103A further includes a determination module 322A configured to provide the modified [m×n] input network traffic matrix 400 that was generated by the removal module 320A to the input matrix-generating module 302A for the next iteration of the method 101 for a case where an additional iteration is required.

In the apparatus described above, the anomaly-detection module 103A further includes an attribute-identification module 324A configured to identify an attribute associated with data of the collected network data flow 116 that are contained within time-bins of the [m×n] input network traffic matrix 400 that are marked as suspicious by the identifying module 318A, for the case where another iteration of the anomaly-detection module 103A is not required.

In the apparatus described above, the anomaly-detection module 103A is configured to detect the anomaly that is associated with a network-adverse event associated with the collected network data flow 116.

According to the embodiments of the invention, a network 100 is provided comprising:
an apparatus 130 to be used on collected network data flow 116, the apparatus 130 comprising:
a server 112, including:
a non-transitory computer-readable storage media 118, including:
an executable program 120 being tangibly stored with the non-transitory computer-readable storage media 118, forming:
an anomaly-detection module 103A being configured to direct the server 112 to:
obtain the collected network data flow 116; and
perform an iterative principal component analysis on the collected network data flow 116 to detect an anomaly associated with the collected network data flow 116.

A non-transitory computer-readable storage media 118 for an apparatus 130 to be used on collected network data flow 116, is also provided, the non-transitory computer-readable storage media 118 comprising:
an executable program 120 being tangibly stored with the non-transitory computer-readable media 118, and the executable program 120 including:
an anomaly-detection module 103A being configured to direct the apparatus 130 to:
obtain the collected network data flow 116; and
perform an iterative principal component analysis on the collected network data flow 116 to detect an anomaly associated with the collected network data flow 116.

General Applicability of I-PCA Operation

The I-PCA operation of method 101 may be applied to any type or sort of network anomaly detection, with the input matrix having the following specification or types: type [A]; type [B]; type [C]; type [D], and/or type [E].

Type [A] includes the input matrix containing sampled values of a random experiment and/or phenomenon.

Type [B] includes sampling procedures performed independent of previous sampled data.

Type [C] includes having the input matrix reflect sampled values of different features of a random experiment and/or a phenomena.

Type [D] includes having a number of samples that may be much more than a number of features that are sampled.

Type [E] includes having a number of rows in an input matrix that is equal to the number of samples performed, and the number of columns of the input matrix that is equal to the number of features of an experiment that are sampled.

For example, the input matrix for the method 101 may contain climatology data gathered over geographic feature (such as, a specific city) over a predetermined time frame (such, as 100 years). Various features may be inputted for the climatology data, including: temperature, humidity, pressure, entropy of temperature, entropy of humidity, etc.; these climate attributes may constitute the feature of the experiment (the number of samples is, for example, 100). So, for the case where six climatology features are measured and sampled, an input matrix of size [100×6] may be provided.

The I-PCA operation may be applied to various areas of science and technology including (and not limited to) network fraud detection, network intrusion detection, network fault detection, network health detection, sensor event detection (in a sensor network), anomalous data detected in a banking network, etc. Depending on the type of application, the input matrix to the I-PCA operation may be different (and is expected to be different).

In view of the above, the method 101 is configured to be adapted such that the anomaly that is detected is by the method 101 (such as, the anomaly-detection operation 103 of FIG. 1B), and is associated with any one of: (A) a network fraud detected in association with the collected network data flow 116; (B) a network intrusion detected in association with the collected network data flow 116; (C) a network fault detected in association with the collected network data flow 116; (D) a network-health condition detected in association with the collected network data flow 116; (E) a network-sensor event detected in association with the collected network data flow 116; (F) a network-adverse event detected in association with the collected network data flow 116; and/or (G) a banking-network adverse event detected in association with the collected network data flow 116.

A sensor network (wireless or wired) includes spatially distributed autonomous sensors configured to: (A) monitor physical or environmental conditions, such as temperature, sound, pressure, etc., and (B) cooperatively pass their data through the sensor network to a main location. Some sensor networks may be bi-directional, also enabling control of sensor activity. The sensor network may be used in industrial and/or consumer applications, such as industrial process monitoring and control, machine health monitoring, and so on.

An example of a banking network includes an interbank network, also known as an ATM (Automated Teller Machine) consortium or the ATM network, and is a computer network that connects the ATMs of different banks, and permits these ATMs to interact with the ATM cards of non-native banks.

Variations

After an iteration of the I-PCA operation, suspicious time-bin features may be replaced by a mean value (if so desired). Any other number, close to mean values may also serve the purpose, depending on the required accuracy of the method. The objective is to eliminate (reduce) the identified anomaly in the traffic matrix before starting the next iteration of the I-PCA operation. For instance, we may replace the elements of the suspicious time-bin with the arithmetic mean of each column excluding the suspicious time-bin or alternatively we can replace it with the arithmetic mean including the suspicious time-bin.

Another variation may include selecting two or more highest eigenvalues as normal (instead of one as described for the I-PCA operation above), and then determining the remaining ones in the next iterations as required. It will be appreciated that the results may vary.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components, that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A method for detecting an anomaly in a network flow data, comprising:
using a processor for:
    (a) collecting the network flow data, characterizing performance of a network, within a time interval divided into multiple time-bins, and generating network flow features from the collected network flow data for each time-bin;
    (b) generating input network traffic matrix containing information for the network flow features for respective time-bins;
    (c) generating a statistical matrix from the input traffic matrix;
    (d) applying a principal component analysis to the statistical matrix to determine one or more principal components of the statistical matrix;
    (e) determining an anomaly score for each time-bin using the principal components;
    (f) identifying one or more time-bins of the input network traffic matrix having highest anomaly scores;
    (g) determining mean values for network flow features across all time-bins, excluding the identified time-bins;
    (h) replacing values of the network flow features in the identified time-bins with respective determined mean values of said network flow features to form a modified input network traffic matrix;
    (i) replacing the input network traffic matrix with the modified input network traffic matrix, and repeating the steps (c) to (h) a predetermined number of times.

2. The method of claim 1, wherein the statistical matrix is a covariance matrix.

3. The method of claim 1, wherein the statistical matrix is a correlation matrix.

4. The method of claim 1, further comprising associating the time-bin of the input network traffic matrix having a highest anomaly score with a potential network cyber-attack.

5. The method of claim 1, wherein the generating network flow features comprises generating the network flow features selected from the list: number of bytes, number of packets, number of flows, number of source IP addresses, number of destination IP addresses, entropy of a source IP address, entropy of a destination IP address, DNS (domain name system) bytes, ICMP (Internet Control Message Protocol) bytes, IRC (Internet Relay Chat) bytes, Unique Source Port count, Unique Destination Port count.

6. The method of claim 1, wherein the determining the anomaly score comprises performing a projection of each time-bin with respect to an anomalous space mapping matrix, calculated using the principal components.

7. The method of claim 1, wherein the determining the anomaly score comprises determining a square prediction error for each time-bin.

8. The method of claim 1, further comprising determining one or more data flows, identified by at least one attribute, contained within the identified time-bins of the input network traffic matrix.

9. The method of claim 8, wherein the attribute includes an IP address, a port number of source, or a port number of a destination for the one or more data flows.

10. The method of claim 1, wherein the step (d) comprises selecting a principal component having the highest eigenvalue.

11. The method of claim 1, wherein the step (d) comprises selecting two or more principal components having highest values.

12. A system for detecting an anomaly in a network flow data, comprising:
- a processor;
- a non-transitory computer readable storage medium having computer readable instructions stored thereon for execution by the processor, causing the processor to:
  - (a) collect the network flow data, characterizing performance of a network, within a time interval divided into multiple time-bins, and generate network flow features from the collected network flow data for each time-bin;
  - (b) generate input network traffic matrix containing information for the network flow features for respective time-bins;
  - (c) generate a statistical matrix from the input traffic matrix;
  - (d) apply a principal component analysis to the statistical matrix to determine one or more principal components of the statistical matrix;
  - (e) determine an anomaly score for each time-bin using the principal components;
  - (f) identify time-bins of the input network traffic matrix having highest anomaly scores;
  - (g) determine mean values for network flow features across all time-bins, excluding the identified time-bins;
  - (h) replace values of the network flow features in the identified time-bins with respective determined mean values of said network flow features to form a modified input network traffic matrix;
  - (i) replace the input network traffic matrix with the modified input network traffic matrix, and repeat the steps (c) to (h) a predetermined number of times.

13. The system of claim 12, wherein the statistical matrix is a covariance matrix.

14. The system of claim 12, wherein the statistical matrix is a correlation matrix.

15. The system of claim 12, wherein the computer readable instructions further cause the processor to associate the time-bin of the input network traffic matrix having a highest anomaly score with a potential network cyber-attack.

16. The system of claim 12, wherein the computer readable instructions further cause the processor to select the network flow features from the list of: number of bytes, number of packets, number of flows, number of source IP addresses, number of destination IP addresses, entropy of a source IP address, entropy of a destination IP address, DNS (domain name system) bytes, ICMP (Internet Control Message Protocol) bytes, IRC (Internet Relay Chat) bytes, Unique Source Port count, Unique Destination Port count.

17. The system of claim 12, wherein the computer readable instructions further cause the processor to perform a projection of each feature of the input network traffic matrix and calculate an anomaly score for each time-bin of the input network traffic matrix.

18. The system of claim 12, wherein the computer readable instructions further cause the processor to determine a square prediction error for each time-bin.

19. The system of claim 12, wherein the computer readable instructions further cause the processor to determine one or more data flows, identified by at least one attribute, contained within the identified time-bins of the input network traffic matrix.

20. The system of claim 12, wherein the attribute includes an IP address, a port number of source, or a port number of a destination for the one or more data flows.

21. The system of claim 12, wherein the computer readable instructions further cause the processor to select a principal component having the highest eigenvalue.

22. The system of claim 12, wherein the computer readable instructions further cause the processor to select two or more principal components having highest values.

* * * * *